United States Patent [19]
DiSanto et al.

[11] Patent Number: 5,467,107
[45] Date of Patent: Nov. 14, 1995

[54] ELECTROPHORETIC DISPLAY PANEL WITH SELECTIVE CHARACTER ADDRESSABILITY

[75] Inventors: Frank J. DiSanto, North Hills; Denis A. Krusos, Lloyd Harbor; Edward Lewit, Roslyn Heights, all of N.Y.

[73] Assignee: Copytele, Inc., Huntington Station, N.Y.

[21] Appl. No.: 313,987

[22] Filed: Sep. 28, 1994

Related U.S. Application Data

[63] Continuation of Ser. No. 130,269, Oct. 1, 1993, abandoned.

[51] Int. Cl.$^6$ ............................................. G09G 3/34
[52] U.S. Cl. ..................................... 345/107; 345/48
[58] Field of Search ............................ 345/48, 49, 50, 345/84, 85, 80, 87, 210, 105, 107; 241/20; 359/296, 54

[56] References Cited

U.S. PATENT DOCUMENTS

| | | | |
|---|---|---|---|
| 3,892,563 | 7/1975 | Ota | 241/20 |
| 4,041,481 | 8/1977 | Sato | 345/107 |
| 4,203,106 | 5/1980 | Dalisa | 345/107 |
| 4,246,579 | 1/1981 | Wiesner | 345/210 |
| 4,655,897 | 4/1987 | DiSanto et al. | 259/296 |
| 4,732,830 | 3/1988 | DiSanto et al. | 359/54 |
| 4,742,345 | 5/1988 | DiSanto et al. | 345/107 |
| 4,947,157 | 8/1990 | DiSanto et al. | 345/107 |
| 5,053,763 | 10/1991 | DiSanto et al. | 345/107 |
| 5,066,946 | 11/1991 | DiSanto et al. | 345/107 |
| 5,174,882 | 12/1992 | DiSanto et al. | 204/299 R |
| 5,223,115 | 6/1993 | DiSanto et al. | 204/299 R |
| 5,266,937 | 11/1993 | DiSanto et al. | 345/107 |

*Primary Examiner*—Richard Hjerpe
*Assistant Examiner*—Steven J. Saras
*Attorney, Agent, or Firm*—Plevy & Associates

[57] ABSTRACT

An electrophoretic display includes a plurality of groups of intersecting row and column electrodes, and a plurality of parallel anode electrode segments disposed in spaced relation within a fluid-tight envelope containing a suspension of pigment particles in a dielectric fluid. Each respective group of row and column electrodes and a corresponding anode segment are indicative of a character line of displayed text. The display includes a line control system operable in a partial erase mode to partially erase a character line having a character thereof selected for erasure and operable in a rewriting mode to rewrite to the character line all characters not selected for erasure. The line control system is operable to alternate sequentially between the two modes until the selected character is simply erased or replaced entirely with a new character.

19 Claims, 4 Drawing Sheets

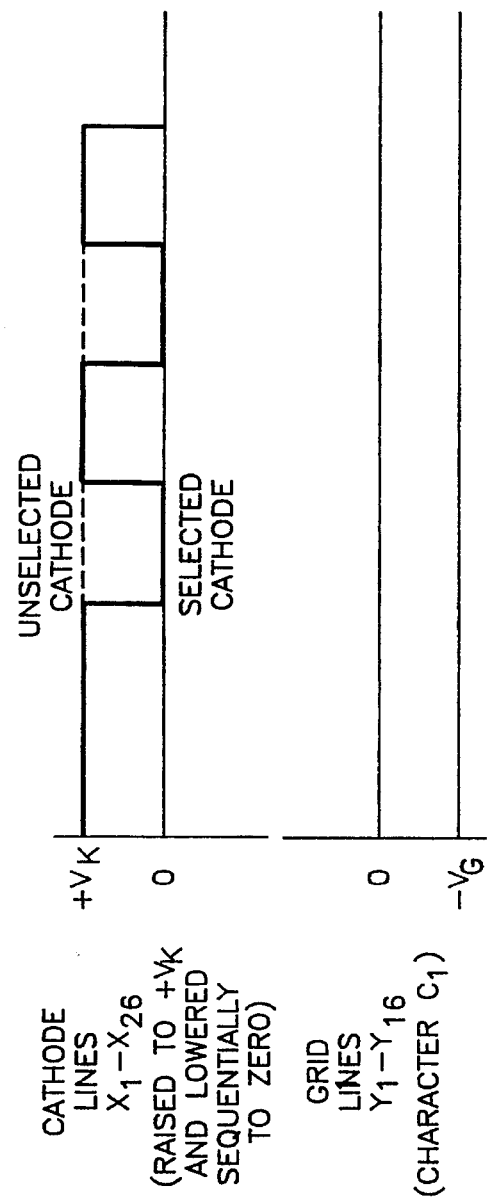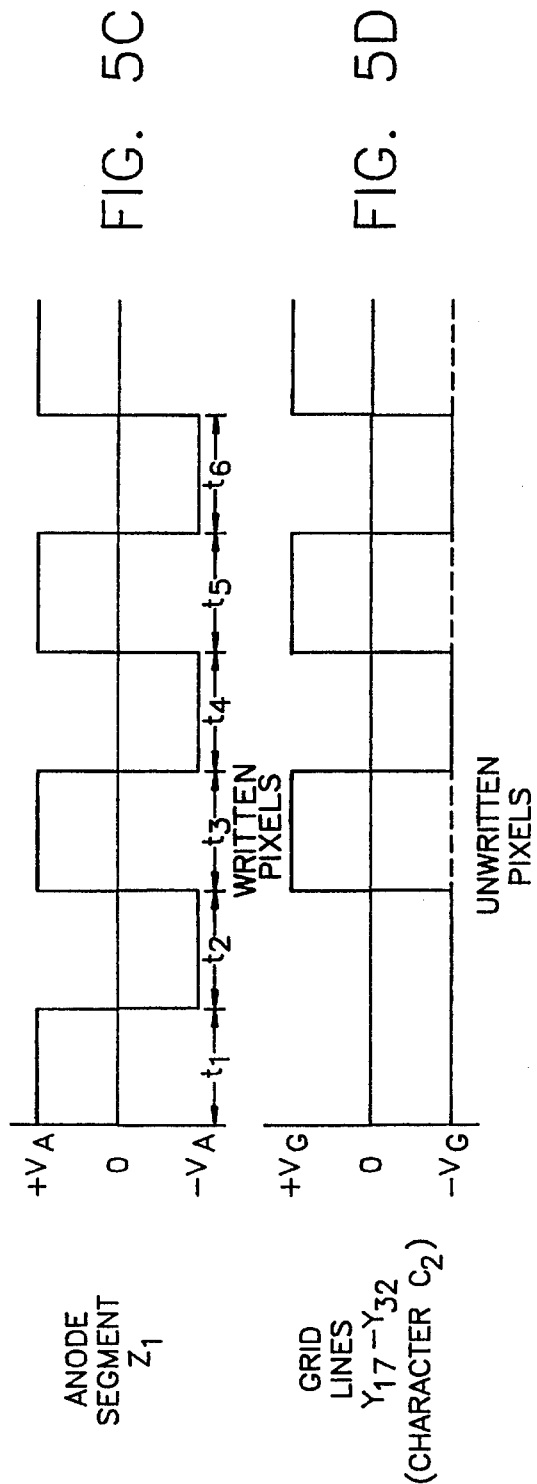

ELECTROPHORETIC DISPLAY PANEL WITH SELECTIVE CHARACTER ADDRESSABILITY

This is a continuation of application Ser. No. 08/130,269, filed on Oct. 1, 1993, entitled Electrophoretic Display Panel with Selective Character Addressability now abandoned.

RELATED APPLICATIONS

The assignee herein, Copytele, Inc. of Huntington Station, N.Y., is the record owner of U.S. patent application entitled ELECTROPHORETIC DISPLAY PANEL WITH SELECTIVE CHARACTER ADDRESSABILITY Ser. No. 08/118,515, filed Sep. 9, 1993 for Christopher A. Laspina et al.

BACKGROUND OF THE INVENTION

This invention relates to electrophoretic display devices in general and, more particularly, to an electrophoretic display apparatus which employs means for selectively erasing and rewriting individual characters on the display panel thereof.

Electrophoretic displays (EPIDS) are now well known. A variety of display types and features are taught in several patents issued in the names of the inventors herein, Frank J. DiSanto and Denis A. Krusos and assigned to the assignee herein, Copytele, Inc. of Huntington Station, N.Y. For example, U.S. Pat. Nos. 4,655,897 and 4,732,830, each entitled ELECTROPHORETIC DISPLAY PANELS AND ASSOCIATED METHODS describe the basic operation and construction of an electrophoretic display. U.S. Pat. No. 4,742,345, entitled ELECTROPHORETIC DISPLAY PANELS AND METHODS THEREFOR, describes a display having improved alignment and contrast. Many other patents regarding such displays are also assigned to Copytele, Inc.

The display panels shown in the above-mentioned patents operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the polarity and direction of the electrostatic field and the charge on the pigment particles.

The electrophoretic display apparatus taught in the foregoing U.S. Patents are "triode-type" displays having a plurality of parallel cathode lines and a plurality of transverse grid electrode lines insulated from the cathode lines. The cathode and grid lines are referred to as row and columns and the terms may be interchanged. The grid cathode structure forms an X-Y matrix enabling one to address tile display at each X-Y intersection and thereby cause pigment particles to migrate relative to the cathode. Given a specific particulate suspension, the sign of the electrostatic charge which will attract and repel the pigment particles will be known. The cathode voltage, the anode voltage, and the grid element voltage can then be ascertained such that when a particular voltage is applied to the cathode and another voltage is applied to the grid, the area proximate their intersection will assume a net charge sufficient to attract or repel pigment particles in suspension in the dielectric fluid.

Since numerous cathode and grid lines are employed, there are numerous discrete intersection points which can be controlled by varying the voltage on the cathode and grid elements to cause localized visible regions of pigment concentration and rarefaction. Essentially then, the operating voltages on both cathode and grid must be able to assume at least two states corresponding to a logical one and a logical zero. Logical one for the cathode may either correspond to attraction or repulsion of pigment. Typically, the cathode and grid voltages are selected such that only when both are a logical one at a particular intersection point, will a sufficient electrostatic field be present at the intersection relative to the anode to cause the writing of a visual bit of information on the display through migration of pigment particles. The bit may be erased, e.g., upon a reversal of polarity and a logical zero-zero state occurring at the intersection coordinated with an erase voltage gradient between anode and cathode. In this manner, digitized data can be displayed on the electrophoretic display.

Accordingly, in order to erase the image in an electrophoretic display of the type in which negatively charged, light colored pigment particles are suspended in a dark-colored suspension medium, the anode is biased negatively relative to the cathode so that the particles are attracted to the cathode. In the aforementioned type of electrophoretic display device, the anode is typically a thin, unitary layer of ITO to which a first voltage is applied in the write mode and a different voltage is applied in an erase mode. All lines of the displayed image are erased simultaneously upon application of the erase voltage anode, and all lines of the display must be rewritten to form the next image frame. The next frame may often have character lines for image portions which are the same as the previous frame, which results in the redundancy of rewriting numerous identical lines from frame to frame.

There are also anode electrode structures which comprise conductor strips instead of a solid thin layer of ITO. One such anode structure is described in U.S. Pat. No. 5,053,763, issued to Frank J. DiSanto and Denis A. Krusos, entitled DUAL ANODE FLAT PANEL ELECTROPHORETIC DISPLAY, which is also owned by the assignee of the present application. In an electrophoretic display panel which is used to display text, characters are formed utilizing a predetermined number of such anode conductor strips in a group, the predetermined number of anode conductor strips being referred to as a character line and each of the predetermined number of anode conductor strips in the character line being referred to as an anode line segment. For example, in a typical such electrophoretic display panel, a character line is comprised of 26 anode line segments, each of which is approximately 0.125" wide and each of which is spaced approximately 0.001" from adjacent segments. A "selective" erase operation of a multiplicity of character lines, each of which comprises a multiplicity of anode line segments, is performed by applying a negative voltage to the anode line segments of the selected character lines.

While the segmented anode structure described above permits a frame to be written much faster than previous display devices, the selective erase operation it performs is not equally effective in all situations. For example, where only a few characters of a single line are to be erased or rewritten and a negative voltage is applied to the anode line segments of the selected character line, a part of adjacent character lines on either side of the selected character line are also erased. As such, the display can temporarily appear illegible or hard to read. Moreover, the erasure of an entire line is time consuming and inefficient when only a few characters or less of a character line are to be erased or rewritten.

In U.S. Pat. No. 5,174,882, entitled ELECTRODE STRUCTURE FOR AN ELECTROPHORETIC DISPLAY APPARATUS and issued on Dec. 29, 1992 to Frank J. DiSanto and Denis A. Krusos, there is illustrated another display device which includes a segmented anode structure. This patent prevents the partial erasure of adjacent character lines by configuring the anode as a plurality of alternating conductors. When selected for erasure of a corresponding character line, one of the conductors is biased with an erase potential of a given polarity and adjacent conductors are biased with a potential of an opposite polarity. The latter conductors prevent the partial erasure of the adjacent character lines. As in the case of the '763 device, however, the operation of this device also requires the erasure and rewriting of all characters of a selected line, which erasure is time consuming and inefficient when only a few characters need be erased or rewritten.

Accordingly, it is an object of the present invention to provide a method and an electrophoretic display which overcomes the aforementioned disadvantages of the prior art devices. In particular, the object of the invention is to provide an electrophoretic display in which individual characters on a line of the display can be selectively erased and rewritten without materially disturbing the appearance of other image characters of that line which remain the same from one frame to the next.

SUMMARY OF THE INVENTION

Pursuant to this object, and others which will become apparent hereafter, an electrophoretic display apparatus comprises a panel having a display surface and containing an electrophoretic dispersion of particles in a suspension medium, writing means for forming a plurality of image lines on the display surface in a write mode by either attracting charged particles from the dispersion onto the display surface or repelling the same therefrom, and selective character erasing means adapted to rapidly erase a single character of a character line without materially affecting the legibility of adjacent characters thereof.

In one embodiment of the invention, the display surface is the cathode of the electrophoretic display and the selective character erasing means comprises a multiplicity of anode line segments, wherein each character line of the display is defined by at least one of the anode segments and by a corresponding group of row and column electrode intersections. The display further includes control means operable in a partial erase mode to apply a first potential bias of a given polarity between an anode segment corresponding to a selected character line containing a character to be erased and a corresponding group of row and column intersections long enough to cause pigment particles to move relative to the intersections and to thereby partially erase the selected character line. The control means are operable in a second mode to apply a second potential bias of an opposite polarity between the anode segment and the group of row and column intersections for a period of time sufficient to partially rewrite characters of the character line not selected for erasure, and the control means is operable to alternately apply the first and second potential biases until the character to be erased is no longer displayed.

A method for selectively erasing a character of a character line comprises the steps of partially erasing a character line having a character thereof selected for erasure, rewriting to the character line all characters not selected for erasure, and repeating the partial erasure and rewriting steps sequentially until the selected character is no longer visible on said display.

BRIEF DESCRIPTION OF THE DRAWINGS

FIGS. 5A–5D are a series of voltage waveforms indicative of a typical pulse sequence used to selectively address and erase a single character of a selected display line.

DETAILED DESCRIPTION OF THE PREFERRED EMBODIMENT

Figure 1:
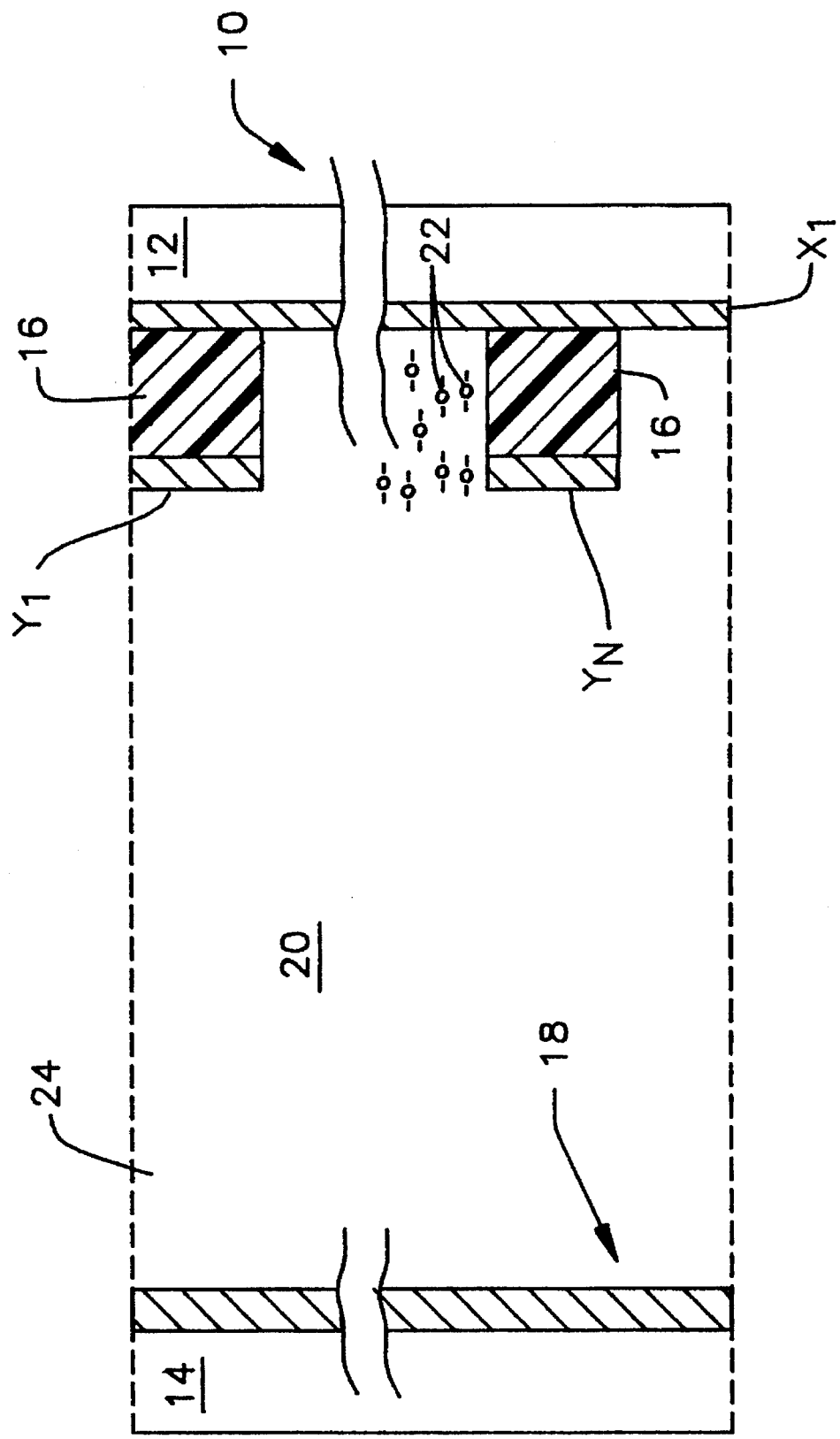
FIG. 1 is a partial cross sectional plan view of an electrophoretic display panel employing a segmented anode structure in accordance with the present invention.

An electrophoretic display device 10 which may employ the segmented anode configuration of the present invention may be seen, for example, by reference to FIG. 1. It will, however, be understood by those of ordinary skill in the art that the description of EPID 10 is for illustrative purposes only and that any EPID configuration may employ the novel segmented anode and associated erase control circuitry to be herein described.

As seen in FIG. 1, the illustrative electrophoretic display device 10 includes two separated substrates 12 and 14, at least one of which is transparent by way of being a material such as glass or plastic. Substrate 12, which is preferably coated with an extremely thin layer of indium tin oxide (ITO), acts as a port through which a viewer of the display may discern image information set forth thereon. The ITO layer is extremely thin, on the order of 100 to 300 angstroms, and hence is truly transparent. Utilizing a technique such as that described in U.S. Pat. No. 4,732,830, the disclosure of which is incorporated herein by reference, a pattern of horizontal lines is etched on the surface of the ITO layer to form a plurality of row or cathode conductors $X_1$ through $X_n$.

Disposed upon the group of cathode conductors are a series of insulator members 16. The insulator members are formed from a photoresist layer such as a phenolic resin impregnated with photoactive material which layer is deposited over the cathode line structure. The photoresist layer is treated to selectively remove photoresist where a plurality of vertical lines are deposited upon the insulator members 16 to form a plurality of column conductors or grid electrodes $Y_1$ through $Y_n$ perpendicular to the cathode conductors. Each grid electrode, as indicated, is positioned above associated cathode lines and insulated therefrom at the areas of intersection (pixels) by the insulator members 16.

A segmented anode structure, which may for example be fabricated by etching a layer of ITO deposited on substrate 14 in accordance with a conventional etching technique, is disposed on substrate 14 and is identified generally by the reference numeral 18. An insulating structure (not shown) maintains the separated substrates and associated cathodes, grid electrodes, and anode segments, and electrophoretic suspension layer 20. The electrophoretic suspension layer 20 includes a dispersion of an electrophoretic material in the form of charged particles 22 in a finely divided powder form suspended in a dielectric fluid 24.

As one can readily ascertain upon reference to the previously cited patents, the pigment at the intersections of selected rows and columns is forced out of wells associated therewith (not shown) by selectively applying voltages to the rows and columns. If the cathode-grid structure is negatively biased relative to the anode and the suspension comprises light-colored, negatively charged pigment particles suspended in a dark colored medium, then application of operating potentials to the X-Y intersections will cause particles at that location to migrate to the anode, thereby creating an image by the light color of the particles against the dark color of the suspension medium, or by the absence of particles at the cathode. Consequently, if a negative potential bias is applied to the anode, the particles will migrate back towards the grid-cathode structure, thereby erasing all or part of the image.

The movement of pigment particles toward the grid-cathode structure during an erase operation is not instantaneous but requires a period of time, which depends upon the dimensions of the display, the applied voltages, and the properties of the suspension. Applying a negative potential for too short a period of time to an anode line segment thus results only in an incomplete or partial erasure of a corresponding character line. Accordingly, a character may be selectively erased or written over without substantially affecting the remainder of the character line by partially erasing the character line, rewriting those characters which are to remain displayed, and repeating the procedure until the selected character is completely erased or replaced by another character. This essentially is the basis of the present application and such techniques for accomplishing this will be further described.

Figure 2:
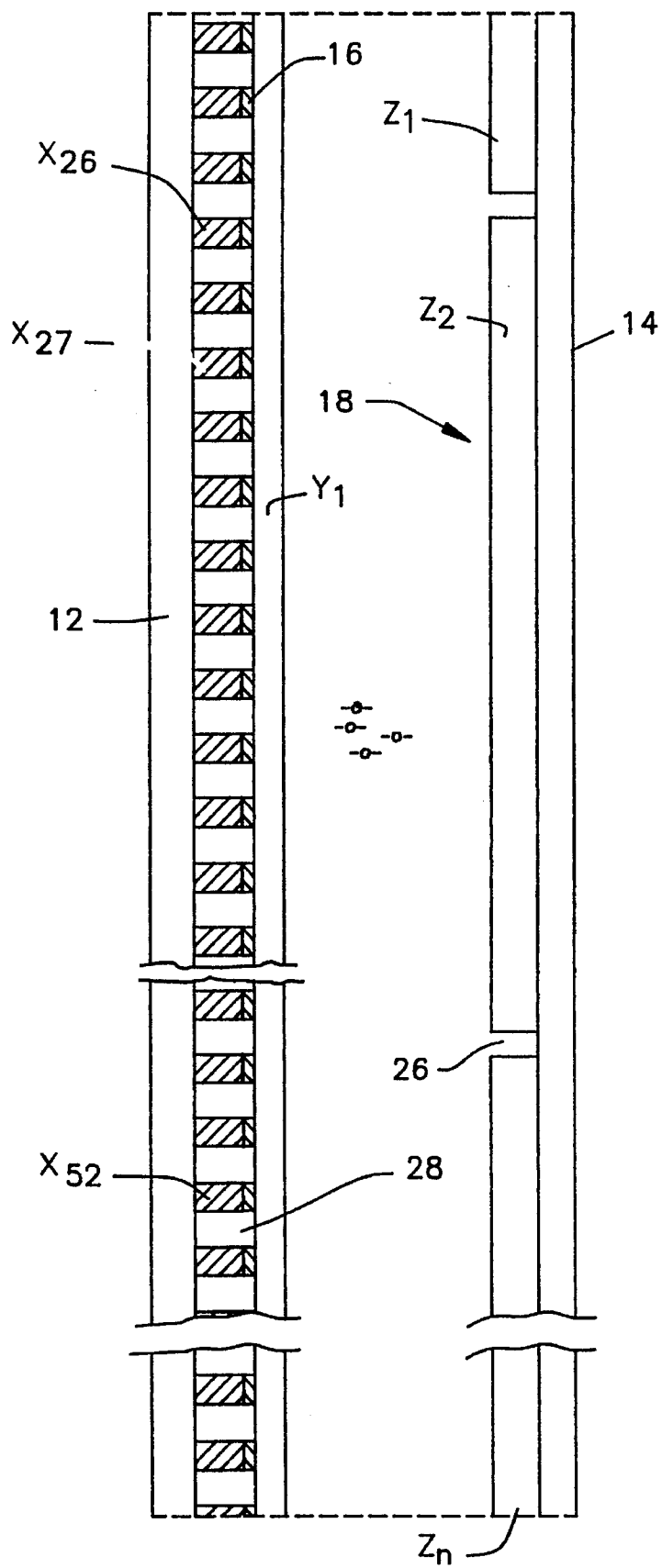
FIG. 2 is a cross-sectional elevation view of an electrophoretic display panel substrate provided with a segmented anode structure in accordance with the present invention.

The present invention is particularly directed to an improved anode structure which allows erasing of one or more selected characters of a given line without erasing all characters of that line, thereby allowing a new frame having substantial portions the same as the previous frame to be written in less time. Referring to FIG. 2, anode structure 18 comprises a multiplicity of individual anode conductor segments $Z_1$ through $Z_n$, with each respective conductor segment being exactly opposite a group of grid and cathode intersections corresponding to a character line of the display. As will soon be apparent, the thickness of tile row or cathode conductors and the spacing therebetween, as well as the height of the character to be displayed, determine the nominal width of the character blocks. Typically, each of the row conductors will have a width on the order of 112 μm while separation between adjacent conductors is typically 15 μm. Accordingly, if the display is to utilize characters which are 26 pixels high, then each anode line segment should be 3.302 mm wide.

Figure 3:
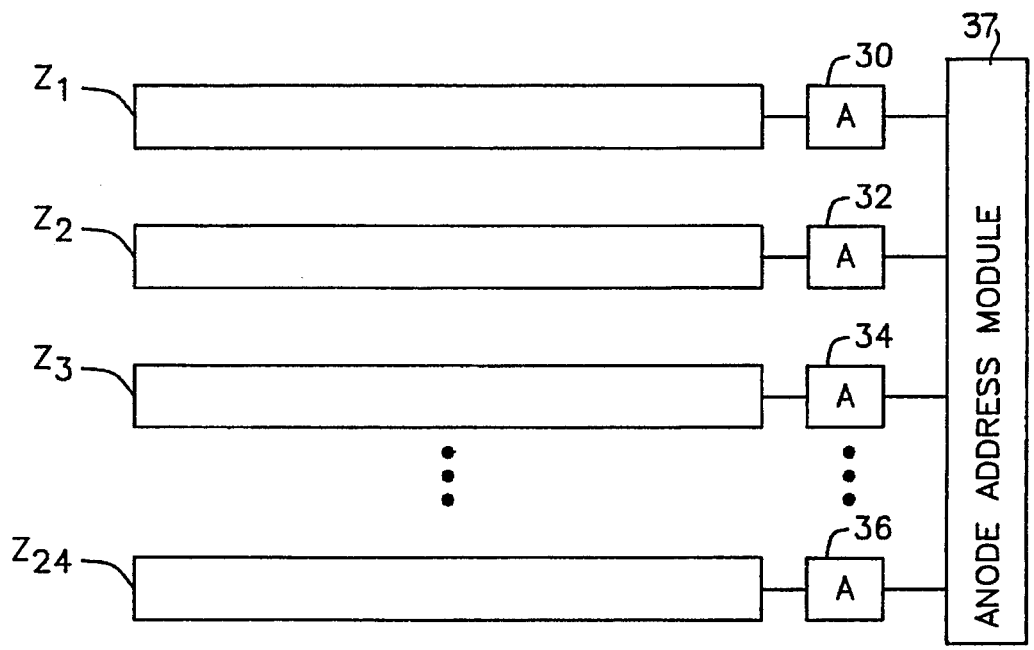
FIG. 3 is a block diagram illustrating a segmented anode structure in accordance with the present invention.

As shown in FIG. 2, each anode line segment is isolated from adjacent blocks by a narrow insulating region 26 that is aligned with inactive areas 28 between cathode lines. It will, therefore, be apparent that the dimensions of these inactive areas will also be a function of the spacing between adjacent cathode conductors. Each character line may comprise a single anode segment or a plurality of independently addressable segments. In accordance with an illustrative embodiment of a display for primarily twenty-four lines of text characters at a time, depicted in FIG. 3 are 4 segments $Z_1$ through $Z_{14}$, in the form of elongated rectangular strips in parallel with and electrically insulated from each other. Each anode line segment has a suitable driving amplifier circuit shown in modular form and indicated by reference numerals 30, 32, 34, and 36, which amplifiers are in turn coupled to an anode address module 37. The driver amplifiers and address module are fabricated by typical integrated circuit techniques and may, for example, be CMOS devices, all of which are well known and many of which are available as conventional integrated circuit chips. As each anode segment is insulated from each other, one or more anode segments corresponding to display lines having characters to be selectively erased can be briefly switched to a partial erase potential while other anode segments are maintained at the write or hold potential. The result is that one or more character lines can be partially erased while the other character lines are maintained at the write or hold potential.

Figure 4:
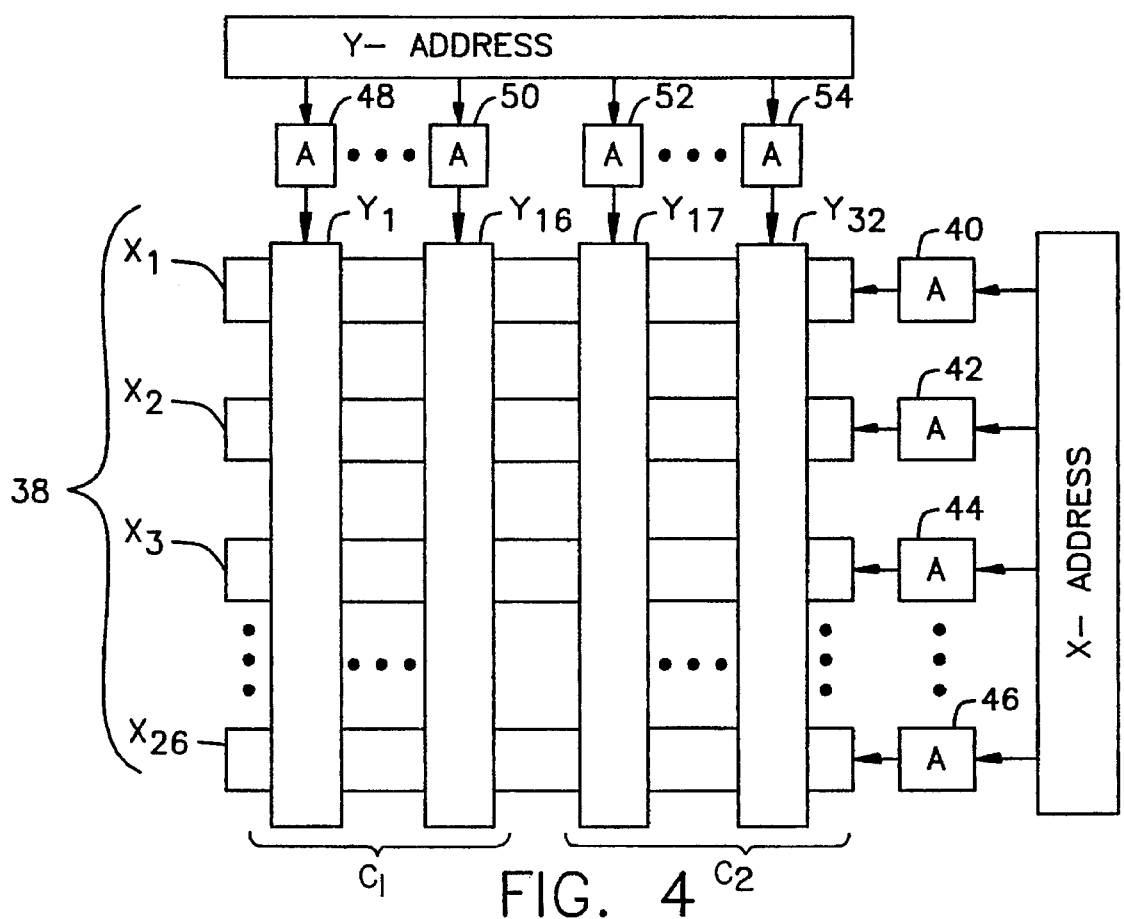
FIG. 4 is a block diagram depicting an X-Y grid-cathode matrix operable in combination with an segmented anode structure to achieve selective character erasure.

An X-Y Write Control module (not shown), in a writing phase, applies a voltage to selected cathode and grid lines. Referring to FIG. 4, there is shown a top view of a typical X-Y matrix consisting of cathode lines which are arranged in the horizontal plane and grid lines which are perpendicular to the cathode lines and insulated therefrom. Thus, there are shown in FIG. 4 four cathode lines, which cathode lines are designated $X_1$, $X_2$, $X_3$, and $X_{26}$ and which are indicative of a character line 38 which is 26 pixels high. It is, of course, understood that the number of cathode lines in the X direction may consist of hundreds of thousands, depending upon the size of the display. As indicated, insulated from the cathode lines and perpendicular thereto, there are also shown four grid lines, $Y_1$, $Y_{16}$, $Y_{17}$, and $Y_{32}$ indicative of two characters $C_1$ and $C_2$ of character line 38, each character being 16 pixels wide. It should also be understood that there are many more grid lines associated with a typical display, the precise number depending upon the number of characters to be displayed on each line.

As seen in FIG. 4, each cathode line has a suitable driving amplifier circuit shown in modular form and indicated by reference numerals 40, 42, 44, and 46. In like manner, each grid line has a suitable driving amplifier referenced by modules 48, 50, 52, and 54. The driver amplifiers are fabricated by typical integrated circuit techniques and may, for example, be CMOS devices, all of which are well known and many of which are available as conventional integrated circuit chips.

As in the case of prior art EPID displays, the display of the present invention can typically be operated in an erase mode, a hold mode, or a writing mode. In a full erase mode, where all character lines of the display are to be erased, all anode line segments are placed at a negative potential while the cathodes as lines $X_1$ to $X_{26}$ are operated at a low potential, or at zero. In this mode, the grid lines as $Y_1$ to $Y_{32}$ are operated at a positive potential. In the hold mode, all anode segments not containing a character to be erased or written over are made positive while the grids are placed at negative potential and the cathodes are held at a positive potential. As one can understand from the above, the grid lines operate between negative and positive voltages. The cathode lines operate between zero and positive voltages. In the write mode, the anode segments are held positive while grid lines which are being written are placed at positive potential while non-writing grid lines are placed at negative potential. In this mode, the writing cathodes are operated at zero potential. Thus, based on the X-Y matrix, one can produce any alpha numeric character.

As indicated, however, the display of the present invention is also operable in a selective character erase mode in which a single character of a given character line as 38 can be erased. Such selective erasure is obtained in accordance with an illustrative embodiment of the present invention by briefly biassing the anode line segment negative relative to the grid-cathode matrix for a time interval sufficient to partially obscure the cathode-grid intersections comprising the corresponding character line but not long enough to render the character line illegible. During this time, some of the pigment particles move relative to the grid-cathode intersections such that after each application of the negative bias, characters to be erased appear progressively lighter. Those characters of character line 38 which are not to be erased are rewritten by using the "write mode" procedure described above. In accordance with the present invention, sequential applications of negative bias to the selected anode segments alternated with "write mode" procedure for pixels which are not to be erased are required before the selected characters are completely erased or written over.

Consider characters $C_1$ and $C_2$ of character line 38, in which character $C_1$ to be erased is defined by the intersections of cathode lines $X_1$ through $X_{26}$ and grid lines $Y_1$ through $Y_{16}$ and character $C_2$ to remain displayed is defined by the intersections of grid lines $Y_{17}$ through $Y_{32}$ with the aforementioned cathode lines. With reference to FIG. 5, there is illustrated an example of timing relationships and waveforms for pulsing the grid-cathode intersections and the anode segment or segments corresponding to character line 38 according to the teachings of the present invention. In FIG. 5, there are illustrated four waveforms (A,B,C,D) indicative of the wave forms provided by the driving amplifiers during the selective character erase mode. With initial reference to FIG. 5A, it can be seen that during time intervals $t_1$ through $t_2$, cathode lines $X_1$ through $X_{26}$ remain at a positive potential $+V_k$. With reference to FIGS. 5B, 5C and 5D, it will be observed that as erasure of character $C_1$ is initiated during time interval $t_2$, grid lines $Y_1$ through $Y_{32}$ remain at a negative voltage $-V_G$ while a negative potential $-V_a$ is applied to anode segment $Z_1$. Time interval $t_2$, which may be on the order of several milliseconds, is selected so that partial erasure of character line 38 is accomplished without rendering the same illegible.

During subsequent interval $t_3$, it will be observed that cathode lines $X_1$ through $X_{26}$ are sequentially lowered to 0 volts and grid lines $Y_1$ through $Y_{16}$ remain at a negative potential $-V_G$ while a positive potential $+V_a$ is applied to anode segment $Z_1$. Grid lines $Y_{17}-Y_{32}$ are made positive or left negative as each cathode line $X_1-X_{26}$ is sequentially lowered to 0 volts to maintain the original character. This alternating sequence is repeated until character $C_1$ is completely erased and character $C_2$ is left unchanged. Thus, character $C_2$ is partially rewritten after each application of a negative bias to the anode, such that at the end only the selected character $C_1$ is erased.

It will, of course, be understood that instead of erasing character as $C_1$, it is possible to partially replace that character with a new character. This may be accomplished by partially rewriting the replacement character after each application of negative bias to the corresponding anode segment, utilizing a sequence such as that illustrated in FIG. 5D. Moreover, it should also be emphasized that a given character line may be served by any desired number of anode segments and that pulses as described herein may be applied to each independently of the others.

Although the present invention has been described in detail, it should be understood that various changes, substitutions, and alterations can be made herein without departing from the spirit and scope of the invention as defined in the appended claims.

What is claimed is:

1. An electrophoretic display apparatus having a selectively erasable display including a plurality of character lines, said display apparatus being capable of allowing a user to erase at least one character in one of said character lines which has been written to said display without having to completely re-write every character in said character line, comprising:

a fluid-tight envelope having a portion thereof which is at least partially transparent;

an electrophoretic fluid contained within said envelope, said fluid having pigmented particles suspended therein, and a plurality of row and column electrodes passing through said envelope and said fluid;

a plurality of anode segments passing through said envelope, wherein each character line of said display is defined by at least one of the anode segments and by a corresponding group of row and column electrode intersections;

line control means operable in a partial erasure mode to apply a first potential bias of a given polarity between an anode segment corresponding to a selected character line and a corresponding group of row and column intersections, said first potential bias being applied for a first given duration of time sufficient to cause said pigment particles to move relative to said intersections and partially erase said selected character line, said line control means being further operable in a rewriting mode to apply a second potential bias of an opposite polarity between said anode segment and said group of row and column intersections for a second given duration of time sufficient to partially rewrite every character of said selected character line except for at least one character selected for erasure, and said line control means being further operable to sequentially apply said first and second potential biases until said at least one of said characters selected for erasure is no longer displayed.

2. The apparatus according to claim 1, wherein each character line is defined by a single anode segment, wherein the length and width of said anode segment are substantially equal to the length and width of a character line.

3. The apparatus according to claim 1, wherein said given polarity of said first potential is negative.

4. The apparatus according to claim 3, wherein said line control means is adapted to apply said first potential by supplying a negative voltage to an anode segment of the selected character line while supplying a negative voltage to column electrodes corresponding to said at least one of said characters selected for erasure.

5. The apparatus according to claim 3, wherein said line control means is adapted to apply said second potential by supplying a first positive voltage to an anode segment of the selected character line while supplying a second positive voltage to the column electrodes corresponding to said at least one of said characters selected for erasure.

6. The apparatus according to claim 5, wherein said line control means is adapted to place cathode lines corresponding to said at least one of said characters selected for erasure at 0 volts while applying said second potential.

7. A method of selectively erasing at least one character written on a character line of an electrophoretic display, said display including at least one character line defined by a group of row and column electrode intersections and by at least one corresponding anode electrode segment, said at least one character line having a plurality of characters wherein at least one of said characters is selected for erasure, and an electrophoretic suspension layer disposed between said row and column electrodes and said anode segment, comprising the steps of:

(a) partially erasing all of said characters of said at least one character line including said at least one of said characters selected for erasure;

(b) rewriting to said at least one character line all of said characters except said at least one character selected for erasure;

(c) repeating steps (a) and (b) until said at least one of said characters selected for erasure is no longer visible on said display.

8. The method according to claim 7, wherein said partially erasing step comprises applying a potential bias of a given polarity between the at least one anode segment and row and column electrode corresponding to said at least one character line for a period of time sufficient to cause pigment particles to move relative to said intersections and to thereby partially erase said character line.

9. The method according to claim 8, wherein said given polarity is negative.

10. The method according to claim 9, wherein said partial erasing step comprises applying a negative voltage to the at least one anode segment.

11. The method according to claim 7, wherein said rewriting step comprises applying a potential bias of an opposite polarity between the at least one anode segment and selected row and column intersections of said at least one character line for a period of time sufficient to at least partially rewrite said characters of said at least one character line not selected for erasure, said selected row and column intersections corresponding to said characters not selected for erasure.

12. The method according to claim 11, wherein said rewriting step comprises applying a first positive voltage to the at least one anode segment of the at least one character line while applying a second positive voltage to the column electrodes corresponding to said characters of the at least one character line not selected for erasure.

13. The method according to claim 12, wherein the second voltage is equal to or greater than said first voltage.

14. The method according to claim 11, wherein a zero voltage is applied to column electrodes corresponding to said at least one character selected for erasure during said rewriting step.

15. The method according to claim 7, further comprising the step of gradually replacing said character selected for erasure with a new character after each partial erasing step.

16. The method according to claim 7, wherein said replacing step comprises applying a potential bias of an opposite polarity between the at least one anode segment and row and column intersections of said at least one character line corresponding to said selected character for erasure for a period of time sufficient to partially replace said selected character for erasure with a new character.

17. An electrophoretic display for allowing a user to first write an image defined by a plurality characters to said display and then erase at least one of said characters without completely re-writing said entire image, comprising:

a fluid-tight envelope having a portion thereof which is at least partially transparent;

an electrophoretic fluid contained within said envelope, said fluid having pigmented particles suspended therein;

a plurality of groups of intersecting row and column electrodes, each group being indicative of a character line which defines a portion of an image to be displayed, said groups being disposed within said envelope;

a plurality of parallel anode electrode segments, each respective one of said anode segments being positioned within said envelope adjacent a corresponding one of said groups; and means operable in a partial erase mode to address said anode electrode segments to partially erase a character line and operable in a rewriting mode to rewrite all characters of said character line except for at least one character selected for erasure, said means being sequentially operable until only said character selected for erasure is no longer visible on said display.

18. The display according to claim 17, wherein each of said groups and said anode segments are fabricated from ITO deposited on a glass sheet.

19. The display according to claim 17, wherein each character line is defined by a plurality of anode segments.

* * * * *